US011085418B2

(12) United States Patent
Giertz

(10) Patent No.: US 11,085,418 B2
(45) Date of Patent: Aug. 10, 2021

(54) WIND FARM CONTROLLER, CONTROLLED UNITS AND METHOD FOR TRANSMITTING CONTROL VARIABLES FROM THE WIND FARM CONTROLLER TO THE CONTROLLED UNITS

(71) Applicant: Wobben Properties GmbH, Aurich (DE)

(72) Inventor: Helge Giertz, Leer (DE)

(73) Assignee: Wobben Properties GmbH, Aurich (DE)

( * ) Notice: Subject to any disclaimer, the term of this patent is extended or adjusted under 35 U.S.C. 154(b) by 130 days.

(21) Appl. No.: 16/329,127

(22) PCT Filed: Aug. 29, 2017

(86) PCT No.: PCT/EP2017/071587
§ 371 (c)(1),
(2) Date: Feb. 27, 2019

(87) PCT Pub. No.: WO2018/041796
PCT Pub. Date: Mar. 8, 2018

(65) Prior Publication Data
US 2019/0226453 A1  Jul. 25, 2019

(30) Foreign Application Priority Data
Sep. 5, 2016 (DE) ...................... 10 2016 116 573.5

(51) Int. Cl.
*F03D 7/02* (2006.01)
*F03D 7/04* (2006.01)
(Continued)

(52) U.S. Cl.
CPC ............ *F03D 7/048* (2013.01); *F03D 7/028* (2013.01); *F03D 7/047* (2013.01); *F03D 9/11* (2016.05);
(Continued)

(58) Field of Classification Search
CPC .......... F03D 7/028; F03D 7/047; F03D 7/048; F03D 9/11; F05B 2270/20; F05B 2270/32;
(Continued)

(56) References Cited

U.S. PATENT DOCUMENTS 5,769,527 A * 6/1998 Taylor .................... H05B 47/12
362/85
7,289,438 B2 10/2007 Wastlhuber et al.
(Continued)

FOREIGN PATENT DOCUMENTS

CN 101091057 A 12/2007
CN 101861690 A 10/2010
(Continued)

OTHER PUBLICATIONS

CLEAVER: Cleaver, Thomas G., "Lesson 12. Power in AC Circuits", ECE 220 Network Analysis I, University of Louisville, Mar. 19, 2012 accessed from <<http://raise.spd.louisville.edu/EE220/L12.html>> on Oct. 29, 2020 (Year: 2012).*
(Continued)

*Primary Examiner* — Michael J Huntley
(74) *Attorney, Agent, or Firm* — Seed IP Law Group LLP

(57) ABSTRACT

Provided is a method for transmitting controlling control variables from a windfarm controller to units including at least one wind power installation or at least one energy store. The method include determining first and second controlling control variable components by the windfarm controller, outputting the first controlling control variable component in a first data packet, outputting the second controlling control variable component in a second data packet, receiving the first and second data packets by a first unit, and determining a controlling control variable from the first and second controlling control variable components. The first data (Continued)

packet has a receiver address which is assigned to the first unit and to at least one further unit, and the second data packet has a receiver address which is assigned to at least the first unit. Provided is a windfarm controller, a wind power installation and a windfarm configured to perform the method.

19 Claims, 3 Drawing Sheets

(51) Int. Cl.
  *G05B 19/418* (2006.01)
  *F03D 9/11* (2016.01)
(52) U.S. Cl.
  CPC ...... *G05B 19/4185* (2013.01); *F05B 2270/20* (2013.01); *F05B 2270/32* (2013.01); *F05B 2270/321* (2013.01); *F05B 2270/402* (2013.01); *F05B 2270/404* (2013.01); *G05B 2219/25211* (2013.01); *G05B 2219/25218* (2013.01); *Y02E 10/72* (2013.01)
(58) Field of Classification Search
  CPC .......... F05B 2270/321; F05B 2270/402; F05B 2270/404; G05B 19/4185; G05B 2219/25211; G05B 2219/25218; Y02E 10/72
  See application file for complete search history.

(56) References Cited

U.S. PATENT DOCUMENTS

| | | | |
|---|---|---|---|
| 7,606,638 B2 | 10/2009 | Fortmann et al. | |
| 8,035,242 B2 | 10/2011 | Landa et al. | |
| 8,373,291 B2 | 2/2013 | Zeumer et al. | |
| 9,104,187 B2 | 8/2015 | Bluhm et al. | |
| 2009/0059832 A1* | 3/2009 | Jhamnani ............ | H04W 72/005 370/312 |
| 2010/0274401 A1 | 10/2010 | Kjaer et al. | |
| 2012/0010755 A1* | 1/2012 | Stapelfeldt ............ | F03D 7/0284 700/287 |
| 2012/0049638 A1* | 3/2012 | Dorn ........................ | H02J 3/42 307/87 |
| 2012/0080881 A1* | 4/2012 | Srivastava .............. | F03D 7/042 290/44 |
| 2013/0046413 A1* | 2/2013 | Ellis ........................ | H02J 7/35 700/295 |
| 2013/0175870 A1 | 7/2013 | Fortmann | |
| 2013/0277972 A1* | 10/2013 | Lovmand ............... | G05B 15/02 290/44 |
| 2016/0069324 A1 | 3/2016 | Busker et al. | |
| 2016/0226249 A1 | 8/2016 | Sakuma et al. | |
| 2016/0333852 A1 | 11/2016 | Busker | |
| 2020/0186194 A1* | 6/2020 | Gilbert .................... | H04B 3/56 |

FOREIGN PATENT DOCUMENTS

| | | |
|---|---|---|
| CN | 101868766 A | 10/2010 |
| CN | 101896872 A | 11/2010 |
| CN | 102465835 A | 5/2012 |
| CN | 105121841 A | 12/2015 |
| CN | 105917544 A | 8/2016 |
| DE | 102010056456 A1 | 6/2012 |
| DE | 102014016664 A1 | 5/2016 |
| EP | 1168120 A2 | 1/2002 |
| EP | 1722102 A1 | 11/2006 |
| EP | 2637367 A1 | 9/2013 |
| JP | 2016524887 A | 8/2016 |
| WO | 2014/029440 A1 | 2/2014 |
| WO | 2015037654 A1 | 3/2015 |
| WO | 2016128005 A1 | 8/2016 |

OTHER PUBLICATIONS

Yu. S. Usunin, "Automatic Control Theory," Chelyabinsk SUSU Publishing Center, 2010, 180 pages. (with English Abstract and Partial English Machine Translation).

* cited by examiner

WIND FARM CONTROLLER, CONTROLLED UNITS AND METHOD FOR TRANSMITTING CONTROL VARIABLES FROM THE WIND FARM CONTROLLER TO THE CONTROLLED UNITS

BACKGROUND

Technical Field

The invention relates to data communication in or with a windfarm, i.e. between units, such as wind power installations, energy stores or windfarm controllers of the windfarm, and a controller, such as windfarm controllers, SCADS systems, cluster controllers or controllers in control centers of operators.

Description of the Related Art

According to the prior art, it is known for wind farms to have a multi-stage, for example two-stage, control path, wherein a first, i.e., a higher-level, control path is provided by a windfarm controller which determines control variables, also referred to as controlling control variables, for individual units of the windfarm, for example the wind power installations of the windfarm. These control variables are then considered as guide variables or setpoints in controllers of the individual units and are fed there to a second, i.e. a lower-level, controller structure.

The German Patent and Trademark Office has identified the following prior art in the priority application for the present application: WO 2016/128005 A1 and DE 10 2010 056 456 A1.

BRIEF SUMMARY

The present invention relates, for example, to a windfarm controller or to the transmission of the controlling control variable determined with the windfarm controller to the wind power installation. The invention thus relates in the case presented by way of example to the aforementioned higher-level controller structure, but is not restricted to this case. On the contrary, the data communication in the windfarm between the windfarm controller and the wind power installation is primarily considered, wherein the invention can be applied to the data communication between cluster controllers for a plurality of windfarm controllers.

In the aforementioned example, the windfarm controller obtains actual values via a feedback from, for example, a measurement point in the vicinity of a network feed-in point of the windfarm, also referred to as a network node. This means that values such as, for example, the voltage, the frequency, the active power and/or the reactive power which the units make available and which are fed into a supply network are measured at the network node at which all units of the windfarm jointly feed power into a network, and are provided as the actual value.

This actual value is fed to the windfarm controller which provides control variables or controlling control variables for the individual units depending on a similarly provided guide variable. The controlling control variables provided by the windfarm controller are transmitted to the individual units of the windfarm via a data line which is designed as an electrical line for data security reasons. However, due to the physical characteristics of these data lines, a data transmission rate is limited so that only a maximum number of data packets can be transmitted in a specific period from the windfarm controller to the individual units.

Since the controlling control variables are provided by the windfarm controller with an update rate of a few seconds or even less than one second, the controlling control variables are transmitted with data packets which are designed as a broadcast. This means that all units of the windfarm are addressed by the data packet or receive this data packet and take on the controlling control variable contained in the data packet according to the update rate in order to update the previously received controlling control variable.

However, in light of the increasingly stringent requirements for parameters which are to be respected in relation to the power to be fed into a network, not only the windfarm-specific interference which can influence the control path of the windfarm controller, i.e., at windfarm level, but also interference which has an individual influence on individual units must be considered. It is therefore desirable to make controlling control variables available for each individual unit from the windfarm controller and to transmit them to the individual units. However, due to the aforementioned limitation of the data transmission rate, in particular also in the case of existing wind farms with older data transmission technology, the transmission of individual controlling control variables to all units at the aforementioned desired fast update rate is not possible.

Provided is provisioning of individual controlling control variables for each unit, for example of a windfarm, with a suitable update rate is intended to be enabled.

For this purpose, the invention relates to a method for transmitting controlling control variables from a controller which is preferably a windfarm controller of a windfarm, a SCADA system, a cluster controller or a controller in control centers of operators, i.e., network and/or windfarm operators, to units, preferably of the windfarm. These units are, for example, wind power installations of the windfarm. A further example of units of the windfarm concerns energy stores, such as, for example, accumulators or a windfarm controller itself if the latter is to be supplied by a cluster controller or by the network operator with controlling control variables within the meaning of the disclosure.

A first controlling control variable component and a second controlling control variable component are determined in the controller. The first controlling control variable component is output in a first data packet and the second controlling control variable component is output in a second data packet. The first data packet with the first controlling control variable component is then received by a first unit. The second data packet with the second controlling control variable component is similarly received by the first unit. A controlling control variable is then formed in the unit from the first controlling control variable component and the second controlling control variable component. The first data packet furthermore has a receiver address which is assigned to the first unit and to at least one further unit. The second data packet has a receiver address which is assigned to at least the first unit.

Two components of a controlling control variable are therefore advantageously transmitted by the controller separately in two data packets. These components can be combined later in the unit to form the controlling control variable. Here, at least the first data packet which has a first controlling control variable component is addressed with a receiver address in such a way that this first data packet is received by more than one unit. A controlling control variable component which is generally valid at the time of transmission for a plurality of or all units during the control is transmitted accordingly with the first data packet. Conversely, the second data packet contains a controlling control variable component which is defined individually for a specific, here the first, unit and is also received accordingly by the specific unit only.

First data packets with the first controlling control variable component are accordingly dispatched more frequently than second data packets with the second controlling control variable component so that an update rate of the controlling control variable component of the individual units can continue to be implemented at a desired high frequency. Conversely, the second controlling control variable components which are provided for the units and are individually defined for each individual unit can be transmitted with a lower update rate.

This furthermore offers the advantage that individual controlling control variable components must be calculated or determined at a lower frequency than globally valid controlling control variable components. In particular, since a determination of individual controlling control variable components also requires more processing power in some instances than the determination of global controlling control variable components, a high update rate of the controlling control variable can therefore also be implemented without the need for a substantially increased processing power in the controller for the additional provision of individual controlling control variable components.

According to a first embodiment, the first controlling control variable component and the second controlling control variable component are stored in a memory of the first unit. After the reception of a further data packet with a further first controlling control variable component, the controlling control variable is then formed in the first unit from the further first controlling control variable component and the stored second controlling control variable component. The further first controlling control variable component is stored simultaneously or thereafter in the memory and the previously stored first controlling control variable component is therefore preferably overwritten.

In the case where a further data packet with a further second controlling control variable component is received by the first unit, the controlling control variable of the first unit is defined from the stored first controlling control variable component and the further second controlling control variable component. In this case also, the further second controlling control variable component is stored in the memory either simultaneously or after the formation of the controlling control variable. The previously stored second controlling control variable component is preferably overwritten with the further second controlling control variable component.

By storing the first and second controlling control variable components in the memory, it is ensured that a controlling control variable can be defined at any time when a further controlling control variable component is received by the first unit, since the corresponding other controlling control variable component which has not just been received is already stored in the memory.

According to a further embodiment, the first data packet and/or the second data packet is/are transmitted cyclically, i.e., at intervals, or in an event-based manner.

According to a further embodiment, the first controlling control variable component corresponds to an absolute or percentage value. The second controlling control variable component also corresponds to an absolute or percentage value. The controlling control variable is then defined in the unit by adding the first controlling control variable component and the second controlling control variable component. An alternative of this example embodiment provides a multiplication of the first and second controlling control variable components. In this alternative, the first controlling variable component corresponds to an absolute or percentage value and the second controlling variable component corresponds to a factor. The controlling control variable in the first unit is thus defined accordingly by multiplying the first controlling control variable component and the second controlling control variable component.

A fast data processing for defining the controlling control variable in the first unit is thus possible. A controlling control variable can thus be implemented directly through simple addition or multiplication without complex recalculations of the first controlling control variable component and the second controlling control variable component.

According to a further embodiment, the controlling control variable can assume a minimum and a maximum value. According to this embodiment, the first controlling control variable has a value between 0 and 100% of the difference between the minimum and maximum value. The second controlling control variable component has a value between −100% and 100% of the difference between the minimum and maximum value.

As a result, it is possible to form a controlling control variable by transmitting a first controlling control variable component and a second controlling control variable component which has the minimum value, even if, for example, the first controlling control variable component has a value which is greater than the minimum value. This is done by means of the second controlling control variable component which, according to the embodiment, can be negative and, for example in the case of the addition of the two controlling control variable components to obtain the controlling control variable, can compensate for the value of the first controlling control variable component.

According to a further embodiment, the first controlling control variable component is formed depending on global, for example windfarm-specific, parameters for a plurality of or all units. This means that the first controlling control variable component is determined in the controller depending on parameters which represent interference on the control paths of all the units which is therefore essentially identical for all units. Changes in the parameters involved here thus have effects on all units to essentially the same extent.

According to this embodiment, the second controlling control variable component is determined depending on unit-specific parameters in the controller. Unit-specific parameters thus describe parameters which, as interference, have a particular influence on an individual unit. Therefore, in the case where a unit-specific parameter changes, this parameter essentially has an influence on the individual unit and must be provided accordingly in determining the controlling control variable of this unit on which the unit-specific parameter has an influence.

According to one specific embodiment, the first controlling control variable component is defined depending on a reference variable which is specified by the operator, i.e., for example, the windfarm operator and/or the network operator. A reference variable is specified accordingly for the controller by the operator and can also be modified by the operator. Reference variables of this type are, for example, specific power specifications, such as, for example, a reference reactive power or a reference active power which is intended to be fed from the windfarm into a connected network.

Depending on the power requirement, which is reflected in the times of day, a smaller quantity of electric power is to be fed accordingly into a network, for example, at night compared with during the day. A reference variable is specified accordingly by the operator in order to control these variations. This reference variable accordingly has influence on all units, for example of a windfarm or cluster, i.e., a plurality of windfarms or a plurality of power generators which are interconnected to form a cluster. The reference variable must accordingly be taken into account equally for all units in the provision of a controlling control variable of one unit. The first controlling control variable component which is transmitted to a plurality of or all units, for example of a windfarm or cluster, is received accordingly by a plurality of or all units with the first data packet and is dependent on the reference variable of the operator must also be taken into account accordingly in the calculation of the controlling control variable in each of the respective units.

According to a further embodiment, the second controlling control variable component is defined for at least one specific unit depending on a reference variable which is defined with parameters specific to the location of the specific unit. Depending on the location of a unit, specific parameters, i.e., parameters specific to this location, accordingly have an influence on the control path of a unit operated at the location. Since the specific parameters only have specific effects on the specific unit at the corresponding location, these parameters must not be taken into account in the provision of a controlling control variable for other units. Thus, only the second controlling control variable component is therefore defined for the specific unit, i.e., in each case individually for a plurality of specific units.

Specific parameters are, for example, the position of the unit within the windfarm or the length of the electrical line from the unit to a feed-in node or transformer of the windfarm. The position of the unit, in the case where the unit is a wind power installation, within the windfarm must be taken into account, for example, in different wind directions. A windfarm normally designates a group comprising a plurality of wind power installations which are positioned in local proximity to one another. Wind power installations are set up here, for example, in rows next to one another or behind one another. In the case where, for example, one wind direction prevails which allows the wind to reach the windfarm from one specific side, the wind power installations in the second row, seen from this wind direction, are shadowed by the wind power installations in the first row. In order to increase the power yield of the windfarm, it is therefore advantageous to operate the wind power installations in the first row at a lower rotational speed than the installations in the rows behind them in order to minimize these shadowing effects. Accordingly, reference variables are thus determined and therefore taken into account differently in the second controlling control variable component, for example depending on the wind direction and the location of the specific unit for each location of the unit.

Further parameters are, for example, the installation date and the associated level of payment for the supplied power of a wind power installation. Wind power installations whose power is paid for differently are in fact frequently operated in the same windfarm, in particular due to windfarm expansions. It is appropriate here, from the perspective of the windfarm operator, to allow better-paid wind power installations to supply proportionately more power than wind power installations whose power is paid for at a relatively lower rate, if a maximum power output of the windfarm is not already supplied.

According to a further embodiment, the controlling control variable, and accordingly preferably the first and the second controlling control variable component also, is a power control variable, i.e., an active power control variable or a reactive power control variable, a voltage control variable or a frequency control variable.

The invention furthermore relates to a controller, for example a windfarm controller for a windfarm, a cluster controller or a controller of an operator to carry out a method according to one of the aforementioned embodiments. The controller comprises a controller computer unit to determine a first controlling control variable component and a second controlling control variable component. The controller furthermore comprises at least one data connection to connect at least one data connection to units, in particular wind power installations or energy stores, for example of a windfarm. The data connection furthermore serves to transmit the first controlling control variable component in a first data packet and to transmit the second controlling control variable component in a second data packet. The controller is configured here to assign a receiver address to the first data packet, said address being assigned to a first unit and to at least one further unit. The controller is furthermore configured to assign a receiver address to the second data packet, said address being assigned to at least the first unit.

According to one embodiment of the controller, said controller comprises a data input to receive reference variables which are specified by a windfarm operator and/or a network operator and are taken into account in determining the first controlling control variable component and/or the second controlling control variable component.

According to a further embodiment, a memory for unit-specific parameters is furthermore provided in the controller. The memory accordingly comprises unit-specific parameters such as the location of each individual unit or the length of the electrical line from each of the units to a feed-in node, for example of the windfarm. Reference variables can thus be taken into account in determining the second controlling control variable component depending on the stored unit-specific parameters.

According to a further embodiment, the controller comprises one or more sensor inputs which are connectable to environment sensors, such as, for example, anemometers. Variable values of environmental parameters can thus be taken into account in defining the controlling control variable components.

The invention furthermore relates to a unit, for example a wind power installation for a windfarm, a cluster controller or a battery container, to carry out a method according one of the above-mentioned embodiments. The unit comprises a data input to receive a first data packet with a first controlling control variable component and to receive a second data packet with a second controlling control variable component. The unit furthermore has a unit computer unit which serves to form a controlling control variable from the first controlling control variable component and the second controlling control variable component.

According to one embodiment, the unit computer unit comprises a memory to store the first controlling control variable component and the second controlling control variable component. The unit computer unit is furthermore configured to add the first controlling control variable component and the second controlling control variable component or to multiply the first controlling control variable component by the second controlling control variable component.

The disclosure furthermore comprises a windfarm with a controller, i.e., a windfarm controller, according to one of the above-mentioned embodiments, and a plurality of units, i.e., wind power installations, according to at least one of the above-mentioned embodiments.

BRIEF DESCRIPTION OF THE SEVERAL VIEWS OF THE DRAWINGS

Further embodiments of the invention can be found in the example embodiments explained in detail below. In the figures.

DETAILED DESCRIPTION

Figure 1:
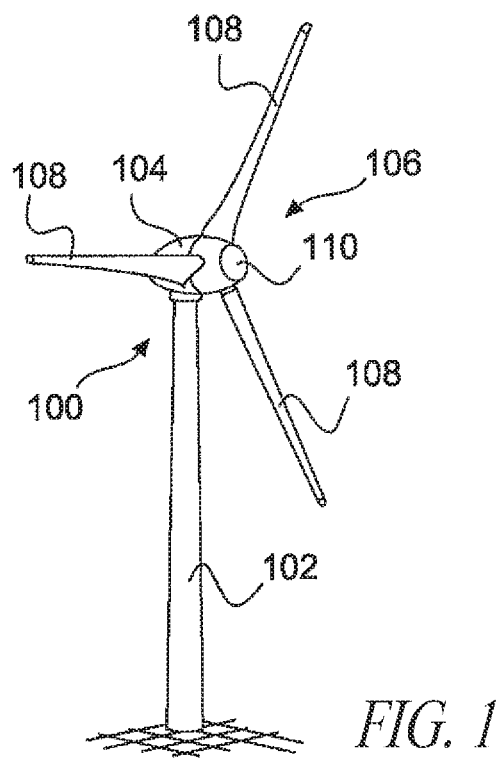
FIG. 1 shows a wind power installation.

FIG. 1 shows a schematic view of a unit 100, i.e., a wind power installation 100, of a windfarm 112. The wind power installation 100 has a tower 102 and a nacelle 104 on the tower 102. An aerodynamic rotor 106 with three rotor blades 108 and a spinner 110 is provided on the nacelle 104. During the operation of the wind power installation, the aerodynamic rotor 106 is set in rotational motion by the wind and therefore also rotates a rotor or winding of a generator which is directly or indirectly coupled to the aerodynamic rotor 106. The electrical generator is disposed in the nacelle 104 and generates electric power. The pitch angles of the rotor blades 108 can be modified by pitch motors on the rotor blade roots of the respective rotor blades 108.

Figure 2:
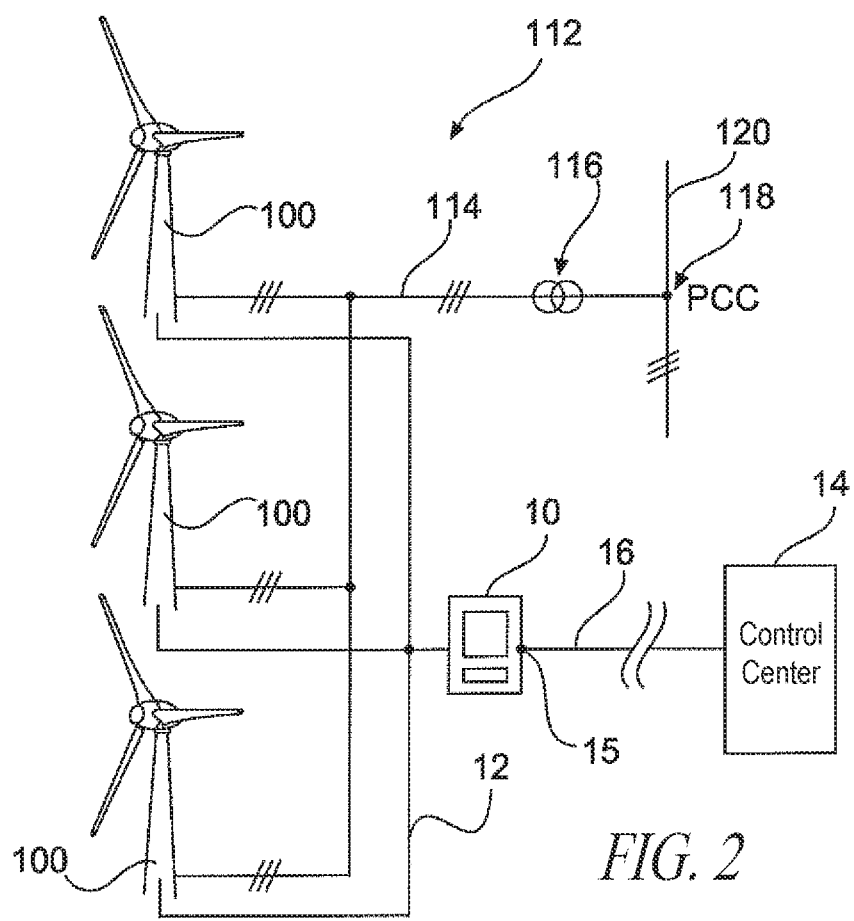
FIG. 2 shows a windfarm.

FIG. 2 shows a windfarm 112 with, by way of example, three wind power installations 100, which may be identical or different. The three wind power installations 100 thus represent essentially any number of wind power installations 100 of a windfarm 112. The wind power installations 100 provide their power, i.e., in particular, the generated current, via an electric windfarm grid 114. The currents or powers of the individual wind power installations 100 generated in each case are added together and a transformer 116 is usually provided to step up the voltage in the windfarm 112 and then feed it at the feed-in point 118, which is also generally referred to as the PCC, into the supply grid 120. FIG. 2 is only a simplified representation of a windfarm 112. The windfarm grid 114 can also, for example, be designed differently in that, for example, a transformer 116 is also present at the output of each wind power installation 100, to mention only one other example embodiment.

FIG. 2 furthermore shows a controller 10, in this case a windfarm controller 10, which is connected via a bus system 12 to each individual wind power installation 100. FIG. 2 furthermore shows a control center 14 of an operator, i.e., a network operator or a windfarm operator. The data transmission between the windfarm controllers 10 and the wind power installations 100 is considered in detail in the present example embodiment. In this specific example, the control center 14 is not therefore described as a controller 10. However, the example embodiment could also be extended by considering the data transmission between the operator and the windfarm controller 10, so that the control center could then be considered as a controller and the windfarm controller as a unit. The control center 14 is connected via a connection 16 to a data input 15 of the windfarm controller 10. The connection 16 corresponds, for example, to a TCP/IP connection.

Figure 3:
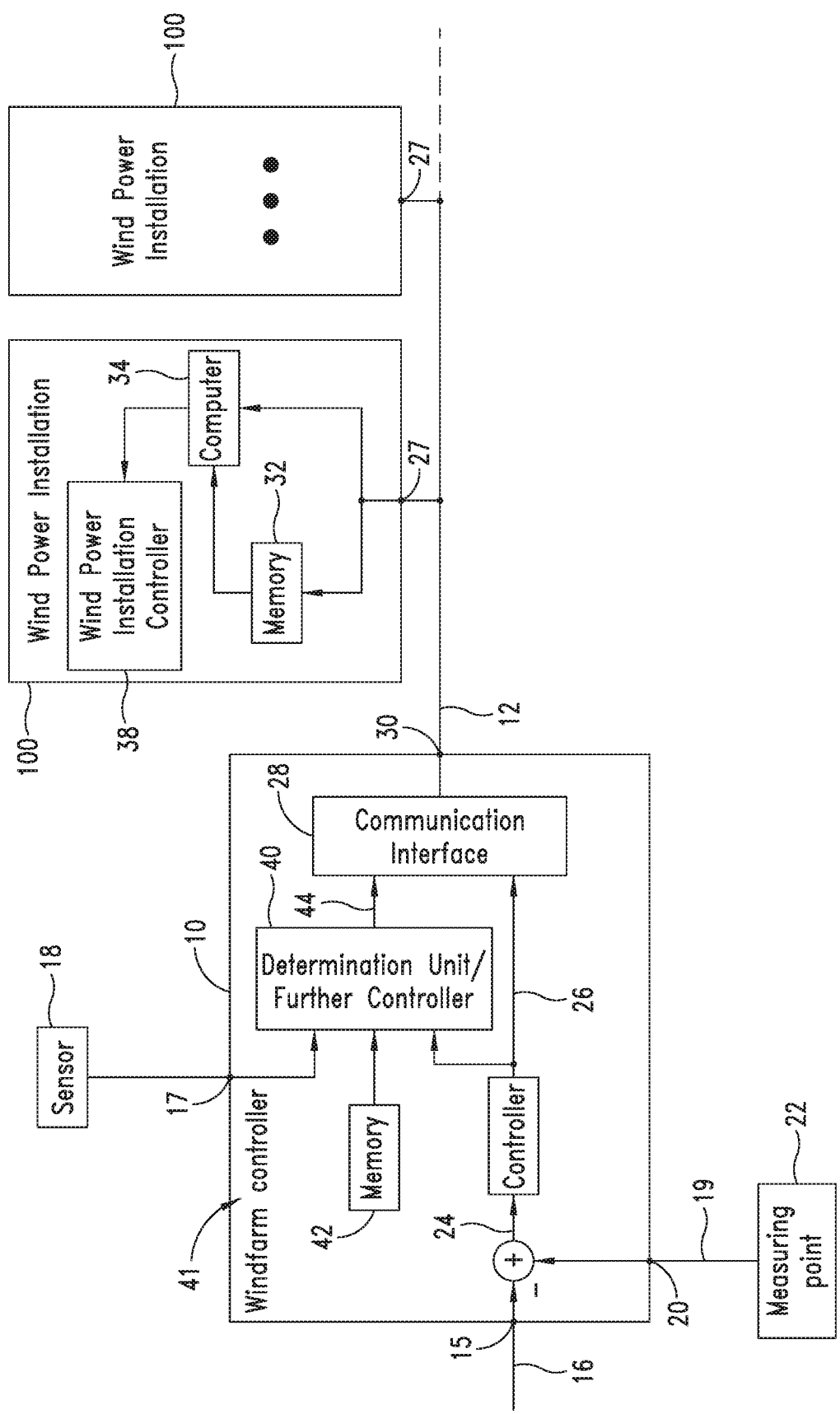
FIG. 3 shows an enlarged view of a windfarm controller and its connection to wind power installations.

FIG. 3 shows an enlarged view of the windfarm controller 10. The windfarm controller 10 comprises a data input 15 via which the windfarm controller 10 is connected to the control center 14 of an operator. The windfarm controller 10 furthermore comprises a data input 17 to which at least one sensor 18 is connected. The sensor 18 is an environment sensor. The sensor 18 serves, for example, to determine the prevailing wind direction and wind speed in the vicinity of the windfarm 112.

The windfarm controller 10 furthermore has a further data input 20 to which a feedback 19 of the control circuit which is controlled with a controller 21 of the windfarm controller 10 is fed. The feedback 19 is connected to a measuring point 22 which is arranged in the vicinity of the feed-in point 118 and measures electrical quantities of the windfarm grid 114. These electrical quantities are, for example, the voltage and/or the frequency of the electrical current or the electrical voltage in the windfarm grid 114. A control deviation 24 is defined in the windfarm controller 10 by feeding the feedback 19 via the data input 20 and a reference variable specified by the operator via the data input 15. The control deviation 24 is fed to the controller 21 which defines a control variable for the units 100 of the windfarm 112.

The control variable is designated as the first controlling control variable component 26. The first controlling control variable component 26 is fed to a communication interface 28 which combines the first controlling control variable component 26 together with a receiver address in a data packet. The data packet is then output via a data output 30 onto the bus system 12, which can also be referred to as a data bus. The receiver address is chosen here by the communication interface 28 in such a way that the data packet is received by all units 100 in the windfarm 112, in each case via their data input 27.

This means that each of the wind power installations 100 extracts the first controlling control variable component 26 from the first data packet and stores it, on the one hand, in the memory 32. On the other hand, the first controlling control variable component 26 is fed to a wind power installation computer unit 34 which defines a controlling control variable 78 for a wind power installation controller 38 from the first controlling control variable component 26. The controlling control variable 78 is therefore a control variable from the perspective of the windfarm controller 10, but at the same time corresponds to a reference variable from the perspective of the wind power installation control.

The first controlling control variable component 26 is additionally fed in the windfarm controller 10 to a determination unit 40 which may also be a further controller to which the feedback 19 is similarly fed. The values from the sensors 18 are furthermore fed to the determination unit 40 and the determination unit 40 can access a memory 42 of the windfarm controller 10. Parameters specific to the location of the individual wind power installations 100, such as, for example, the positions of the wind power installation 100 within the windfarm 112, are stored in the memory 42.

Second controlling control variable components 44 are then defined in the determination unit 40 for each individual of the wind power installations 100 on the basis of the first controlling control variable component 26, the specific data stored in the memory 42 and the sensor data from the sensors 18. These second controlling control variable components 44 are similarly fed to the communication interface 28 which creates second data packets, wherein each of the second data packets contains a second controlling control variable component 44 and the address of the specific wind power installation 100 for which the second controlling control variable component 44 was determined, taking into consideration the specific data of this wind power installation 100 stored in the memory 42. These second data packets are similarly output via the data output 30 onto the bus system 12. Each of the wind power installations 100 then correspondingly receives the data packet addressed to the respective wind power installation 100. The second controlling control variable component 44 is then extracted therefrom and is similarly stored in the memory 32 of the respective wind power installation 100.

It is thus possible to provide a first controlling control variable component 26 and an individual second controlling control variable component 44 for each wind power installation 100 and transmit it individually to each of the wind power installations 100. The individual controlling control variable component 44, i.e., the second controlling control variable component 44, is updated here with a relatively low frequency so that data packets with a first controlling control variable component 26 are output by the communication interface 28 with a relatively higher repetition rate or frequency.

First data packets with the first controlling control variable component 26 are transmitted accordingly, for example always after the expiry of a time period which is, for example, below a time period of 10 seconds, for example a time period of one second. Second data packets with second controlling control variable components 44 are transmitted, for example, only in the case where, for example, a changing wind direction is detected with the sensor 18 and therefore control variables differing from the generally valid control variables are necessary for the respective wind power installation 100 due to the positions of individual wind power installations 100 within the group of the windfarm 112.

Figure 4:
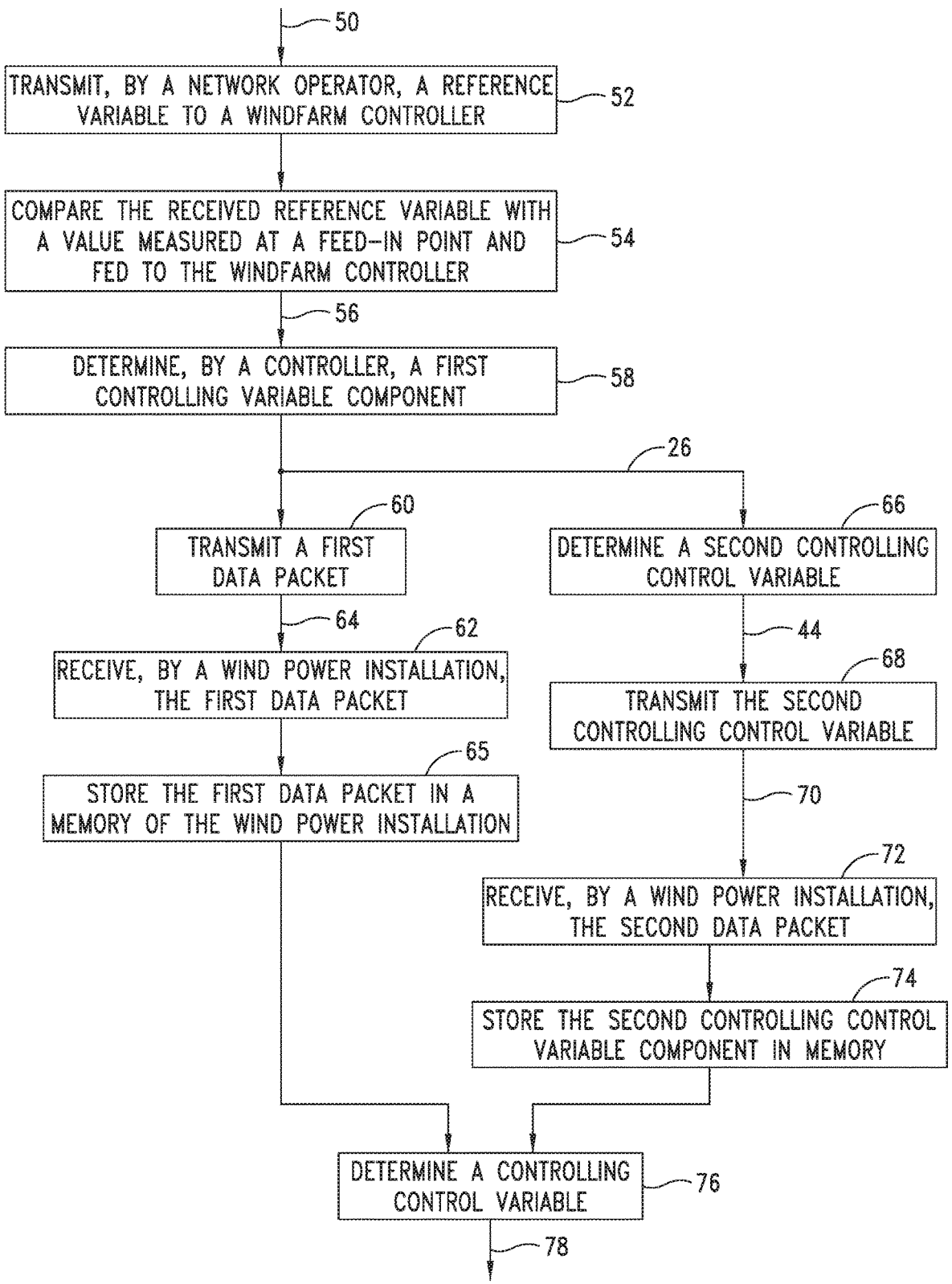
FIG. 4 shows an example embodiment of the method.

FIG. 4 shows a sequence of a method according to one example embodiment. A reference variable 50 is first transmitted from a network operator to a windfarm controller 10 and is received in step 52. In step 54, the received reference variable 50 is compared with an actual value that was measured at the feed-in point 118 and was similarly fed to the windfarm controller 10. The difference 56 is then fed to a controller 21 of the windfarm controller 10 and a first controlling control variable component 26 is determined in the controller 21 in a step 58. The first controlling control variable component 26 is then fed to a communication interface 28 which transmits a first data packet 64 in a transmission step 60. The first data packet 64 is then received in step 62 by a wind power installation 100 and, in a storage step 65, is stored in a memory 32 of the wind power installation 100.

Simultaneously, the first controlling control variable component 26, after having been determined by the controller 21 in step 58, is fed to a determination unit 40 and a second controlling control variable component 44 is determined 66 in the determination unit 40. The second controlling control variable component 44 is then similarly fed to a communication interface 28 and is transmitted in a second data packet 70 in a step 68.

In a step 72, the second data packet 70 is received by a wind power installation 100 and the second controlling control variable component 44 of the second data packet 70 is stored in a memory 42 in a step 74. After the first controlling control variable component 26 and the second controlling control variable component 44 have been stored by the wind power installation 100 in steps 65 and 74, a controlling control variable 78 is then defined in a step 76 by a wind power installation computing unit 34 and is fed to a controller 38 of the wind power installation 100.

REFERENCE NUMBER LIST

100 Wind power installation/wind power installations/unit
102 Tower
104 Nacelle
106 Aerodynamic rotor
108 Three rotor blades
110 Spinner
112 Windfarm
114 Windfarm grid
116 Transformer
118 Feed-in point
120 Supply network
10 Windfarm controller/controller
12 Bus system
14 Control center
15, 20 Data input
16 Connection
17 Sensor data input
18 Sensor/environment sensor
19 Feedback
21 Controller
22 Measuring point
24 Control deviation
26 First controlling control variable component
27 Data input of a unit
28 Communication interface
30 Data output
32 Memory of the unit
34 Wind power installation computer unit/unit computer unit
38 Wind power installation controller
40 Determination unit
41 Controller computing unit
42 Memory of a windfarm controller
44 Second controlling control variable component
50 Reference variable
52, 54, 58, 62,
72, 74, 76 Step
56 Difference
60 Transmission step
64 First data packet
65 Memory step
68 Transmitted/transmission
70 Second data packet
78 Controlling control variable

The invention claimed is:

1. A method for transmitting control variables from a controller to wind power installations or energy stores, comprising:
   determining a first control variable component;
   determining, by the controller, a second control variable component;
   outputting the first control variable component in a first data packet;
   outputting the second control variable component in a second data packet;
   receiving, by at least one wind power installation or energy store, the first data packet including the first control variable component;

receiving, by the at least one wind power installation or energy store, the second data packet including the second control variable component; and determining, by the at least one wind power installation or energy store, a control variable from the first control variable component and the second control variable component, wherein the first data packet has a first receiver address that is assigned to the at least one wind power installation or energy store and to at least one further wind power installation or energy store, and the second data packet has a second receiver address that is assigned to the at least one wind power installation or energy store, and wherein first data packets having respective first controlling control variable components are sent more frequently than second data packets having respective second controlling control variable components.

2. The method as claimed in claim 1, comprising:
storing the first control variable component and the second control variable component in memory of the at least one wind power installation or energy store;
receiving a first further data packet with a further first control variable component;
after receiving the first further data packet with the further first control variable component, determining the control variable from the further first control variable component and the stored second control variable component;
receiving a second further data packet with a further second control variable component;
after receiving the second further data packet with the further second control variable component, determining the control variable from the stored first control variable component and the further second control variable component; and
storing the further first control variable component or the further second control variable component in the memory.

3. The method as claimed in claim 1, comprising:
transmitting the first data packet and the second data packet cyclically or in an event-based manner.

4. The method as claimed in claim 1, wherein:
the first control variable component corresponds to a first absolute or percentage value and the second control variable component corresponds to a second absolute or percentage value and the method comprises: determining the control variable by adding the first control variable component and the second control variable component; or
the first control variable component corresponds to an absolute or percentage value and the second control variable component corresponds to a factor and the method comprises: determining the control variable by multiplying the first control variable component by the second control variable component.

5. The method as claimed in claim 1, wherein the control variable has values between a minimum value and a maximum value and the first control variable component has a value between 0 and 100% of a difference between the minimum value and maximum value and the second control variable component has a value between −100% and 100% of the difference between the minimum value and maximum value.

6. The method as claimed in claim 1, comprising:
determining the first control variable component based on global parameters for a plurality of or all of the wind power installations or energy stores of a windfarm; and
determining the second control variable component based on specific parameters to the at least one wind power installation or energy store.

7. The method as claimed in claim 1, comprising:
determining, by the controller, the first control variable component depending on a reference variable for the controller that is specified by a windfarm operator or network operator.

8. The method as claimed in claim 1, wherein the second control variable component is defined for a specific at least one wind power installation or energy store depending on a reference variable which is defined with parameters specific to the specific at least one wind power installation or energy store.

9. The method as claimed in claim 1, wherein the control variable is a power control variable including an active power control variable, a reactive power control variable, a voltage control variable or a frequency control variable.

10. A controller for a windfarm, comprising:
at least one data output configured to connect, via a data connection, to wind power installations or energy stores, and to transmit a first control variable component in a first data packet and a second control variable component in a second data packet, wherein the controller is configured to:
determine the first control variable component and the second control variable component, and wherein the first data packet has a first receiver address that is assigned to at least one wind power installation or energy store and to at least one further wind power installation or energy store, and the second data packet has a second receiver address that is assigned to the at least one wind power installation or energy store,
wherein first data packets having respective first controlling control variable components are sent more frequently than second data packets having respective second controlling control variable components.

11. The controller as claimed in claim 10, comprising:
at least one data input configured to receive a reference variable from a network operator or a windfarm operator.

12. The controller as claimed in claim 10, comprising:
a memory configured to store unit-specific parameters.

13. The controller as claimed in claim 10, comprising:
at least one data input configured to connect at least one sensor that is an environmental sensor for determining at least one of wind direction or wind speed.

14. A wind power installation for a windfarm, comprising:
at least one data input configured to receive a first data packet including a first control variable component and a second data packet including a second control variable component; and
a computer configured to determine a control variable from the first control variable component and the second control variable component, wherein the first data packet has a first receiver address that is assigned to the wind power installation and to at least one further wind power installation, and the second data packet has a second receiver address that is assigned to the wind power installation,
wherein first data packets having respective first controlling control variable components are sent more frequently than second data packets having respective second controlling control variable components.

15. The wind power installation as claimed in claim 14, wherein the computer is configured to add or multiply the first control variable component and the second control variable component, and the wind power installation comprises:
   memory configured to store the first control variable component and the second control variable component.

16. The windfarm as claimed in claim 14, comprising:
   a windfarm controller; and
   a plurality of wind power installations including the wind power installation.

17. The method as claimed in claim 1, wherein the controller is a windfarm controller.

18. The method as claimed in claim 6, wherein the global parameters are windfarm-specific parameters.

19. The method as claimed in claim 8, wherein the parameters specific to the specific at least one wind power installation or energy store include a position of the specific at least one wind power installation or energy store within a windfarm or a length of an electrical line from the specific at least one wind power installation or energy store to a network feed-in node of the windfarm.

* * * * *